United States Patent [19]
Nelson

[11] Patent Number: 5,142,852
[45] Date of Patent: * Sep. 1, 1992

[54] DETHATCHING APPARATUS

[76] Inventor: Danny L. Nelson, 9214 Sappington Rd., Sappington, Mo. 63126

[*] Notice: The portion of the term of this patent subsequent to Aug. 6, 2008 has been disclaimed.

[21] Appl. No.: 738,807

[22] Filed: Jul. 31, 1991

Related U.S. Application Data

[63] Continuation of Ser. No. 500,027, Mar. 26, 1990, Pat. No. 5,036,651, which is a continuation-in-part of Ser. No. 288,977, Dec. 22, 1988, Pat. No. 4,910,948.

[51] Int. Cl.⁵ .................................. A01D 34/48
[52] U.S. Cl. ...................... 56/16.6; 56/199; 56/202; 172/21
[58] Field of Search .............. 56/16.4, 16.5, 16.6, 56/16.1, 198, 199, 202; 172/21, 27, 28, 76, 78, 118, 123, 22, 43, 119, 810, 834, 343

[56] References Cited

U.S. PATENT DOCUMENTS

| | | | |
|---|---|---|---|
| 2,722,795 | 11/1955 | Warner | 56/249 |
| 2,946,169 | 7/1960 | Soteropulos | 56/16 |
| 3,739,856 | 6/1973 | Ray | 172/21 |
| 4,068,455 | 1/1978 | Zehrung, Jr. et al. | 56/16.1 |
| 4,172,356 | 10/1979 | Cole | 56/380 |
| 4,769,976 | 9/1988 | Bassett et al. | 56/7 |
| 4,802,536 | 2/1989 | O'Neal | 172/21 |
| 4,905,460 | 3/1990 | Toman | 56/12.7 |
| 4,910,948 | 3/1990 | Nelson | 56/16 |

*Primary Examiner*—Terry Lee Melius
*Attorney, Agent, or Firm*—Laney, Dougherty, Hessin & Beavers

[57] ABSTRACT

A grass dethatching apparatus which includes a frame adapted for mounting the apparatus on a prime mover vehicle. The frame supports a drum housing which defines a thatch discharge opening in the upper forward side thereof. The drum housing carries a pivotably mounted, vertically adjustable roller on the forward side thereof, and a stationary supporting roller on the rear side thereof. A roller actuation system is used to adjust the position of the vertically adjustable roller. A rotary drum subassembly is mounted in the drum housing for rotation about a horizontal axis, and includes axially and circumferentially spaced blades mounted on spacer sleeves. The sleeves are mounted on an elongated shaft. A thatch-catching bag is detachably mounted on the drum housing at a location for catching thatch discharged through the thatch discharge opening in the housing.

4 Claims, 4 Drawing Sheets

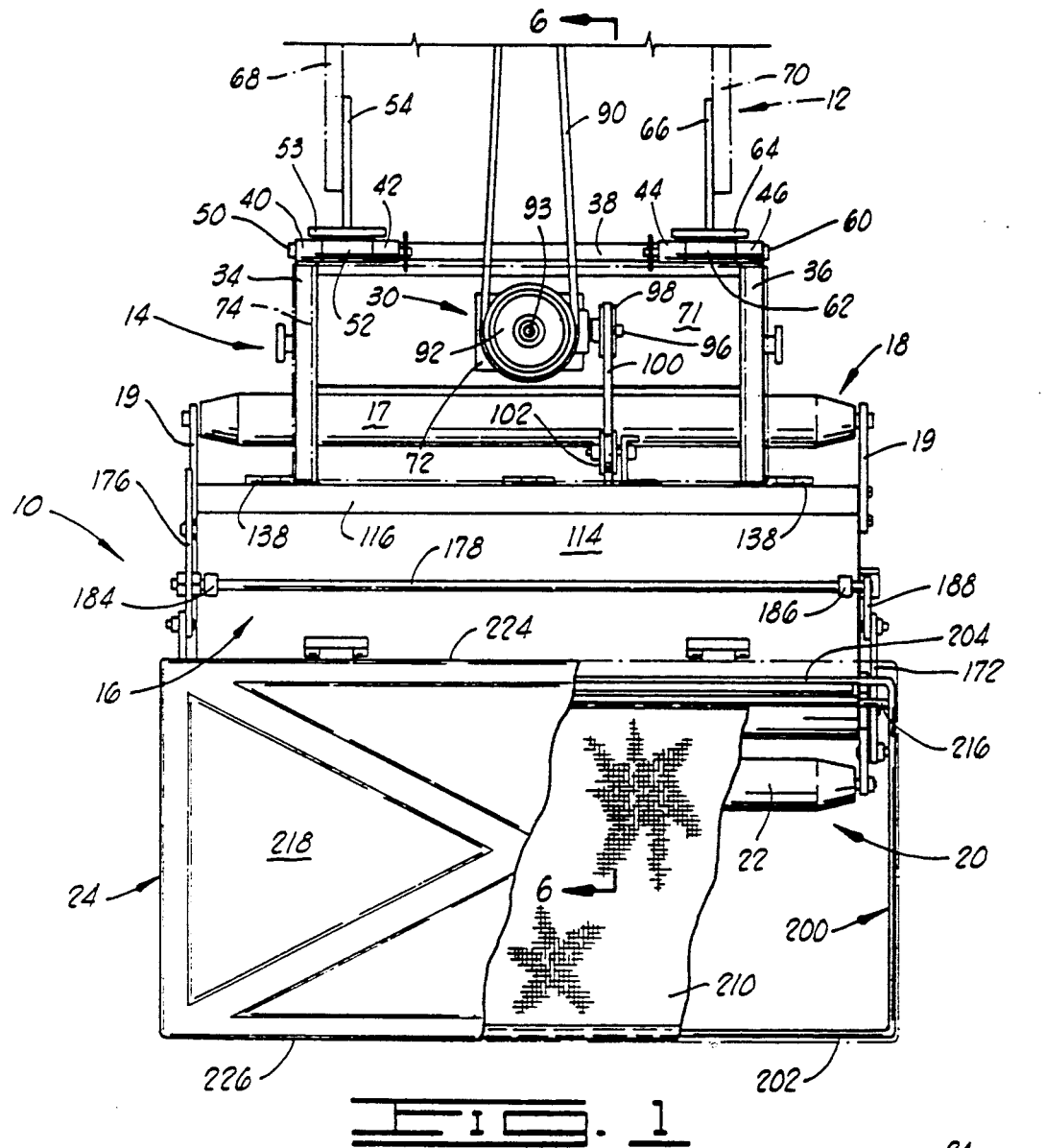
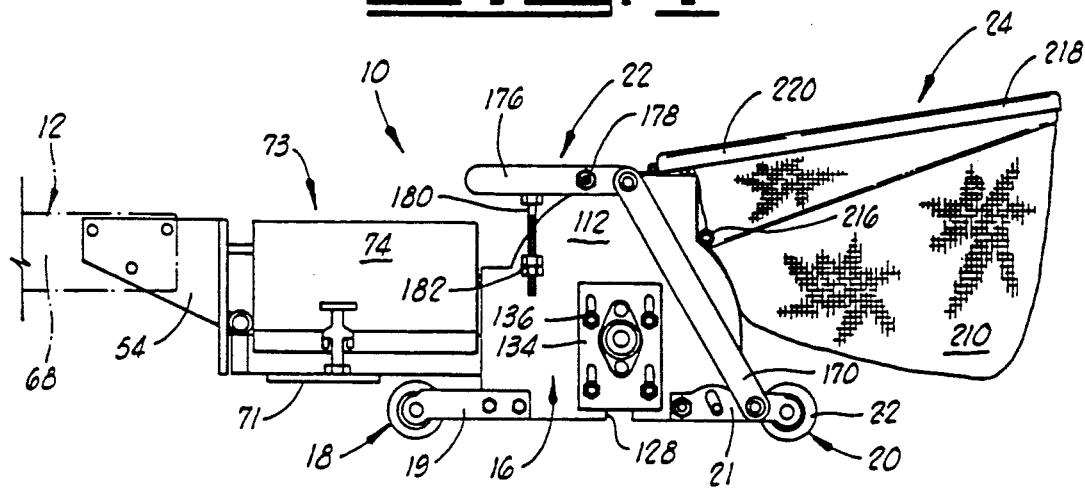

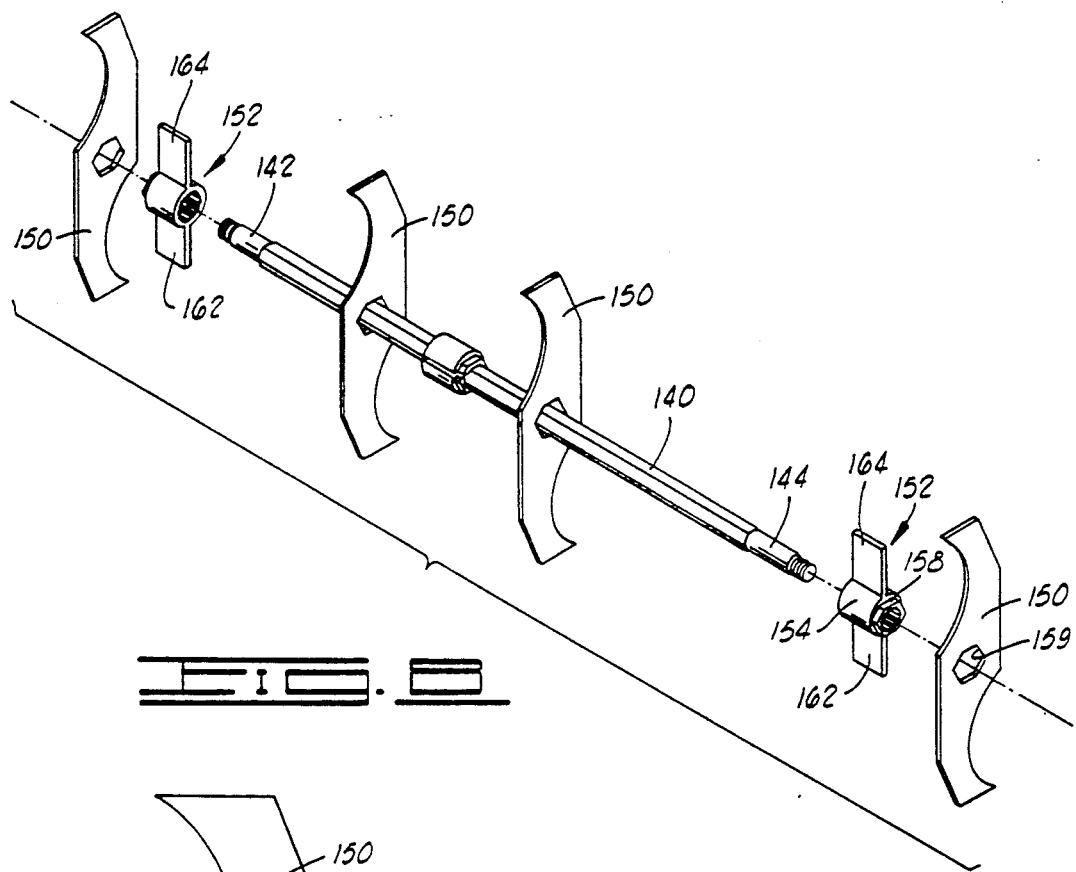
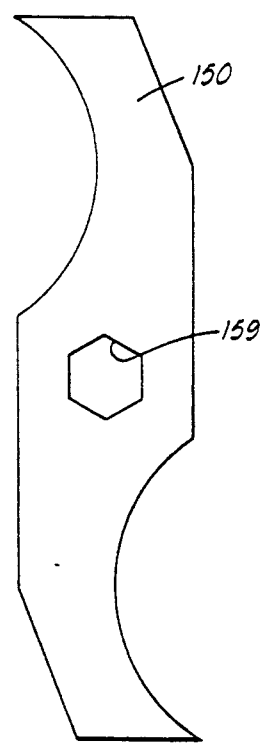
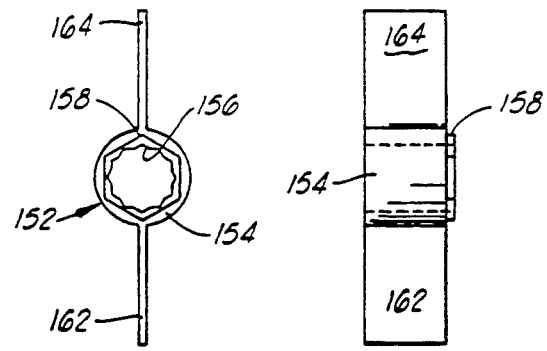

DETHATCHING APPARATUS

RELATED APPLICATION

This application is a continuation-in-part of my U.S. patent application Ser. No. 288,977, filed on Dec. 22, 1988 and entitled "FRONT MOUNTED DETHATCHING APPARATUS", U.S. Pat. No. 4,910,948.

FIELD OF THE INVENTION

This invention relates to dethatching machines of the type adapted to be mounted on the forward side of a prime mover upon which the operator of the dethatching machine can ride and currently control the operation of the dethatching apparatus.

BACKGROUND OF THE INVENTION

Brief Description Of The Prior Art

In my co-pending U.S. patent application Ser. No. 288,977 entitled "FRONT MOUNTED DETHATCHING APPARATUS", I disclose a dethatching apparatus which is adapted to be mounted ahead of a self-propelled vehicle upon which the operator of the dethatching apparatus can ride, while viewing and controlling the dethatching apparatus. The dethatching apparatus disclosed in my co-pending application includes an elongated rotary drum contained within a suitable drum housing. The drum carries a plurality of axially and circumferentially offset blades which function to remove thatch from lawns by cutting through the thatch and propelling it upwardly in the housing and out through an opening at the upper forward side of the housing. The dethatching drum can be adjusted in its position relative to the ground, and thus the depth of cut can be changed, by a foot operated lever system which can be reached and operated by the operator from his riding position.

U.S. Pat. No. 3,739,856 issued to Ray shows an aerator-type attachment structure for aerating the soil. The aerating plates carried on a drum or shaft are polygonally-shaped, and are staggered circumferentially in axially spaced relation along the shaft.

Soteropulos U.S. Pat. No. 2,946,169 discloses a field forage harvester where a drum with blades carried thereon is caused to rotate rapidly, and the severed crop is then forced upwardly and outwardly through an opening or discharge stack in the top of the housing.

Warner U.S. Pat. No. 2,722,795 discloses a racking attachment which is mounted ahead of a riding lawn mower and is designed to cut the roots of undesirable grasses growing in a lawn, and to give the other grasses increased aeration to greatly improve the growth of the desirable ornamental grasses. The shaft which carries these blades is connected to a prime mover on the large, wheel-supported chassis.

BRIEF DESCRIPTION OF THE PRESENT INVENTION

The present invention provides a dethatching apparatus adapted to be pivotally mounted on the forward side of a prime mover vehicle (and is thus a front mounted adjunct to such vehicle), and which can be controlled by a rider on the prime mover vehicle, and looking in the direction of its travel so as to be able to perceive the attitude of the dethatching apparatus at all times.

The dethatching apparatus of the invention includes a pair of mounting plates used to mount the chassis or framework of the dethatching apparatus to the prime mover vehicle. The framework or chassis carries the drive system by which the rotary cutting drum of the dethatcher apparatus is driven in rotation. A belt drive is used for powering the drum and functions to deliver power to an elongated shaft forming a part of the multi-bladed dethatching drum used in the apparatus. The dethatching drum is mounted inside a protective housing, and both the drum and its surrounding housing can be raised and lowered so as to precisely adjust and set the distance of the shaft of the dethatching drum above the ground, and thus set the depth to which the blades of the dethatching apparatus of the dethatching drum will cut. An opening is provided at the top forward side of the dethatching drum housing through which the removed thatch can be discharged into a large flexible bag subassembly. The dethatching apparatus is further characterized in having a movable closure flap at the lower rear side of the dethatching drum housing. This flap can be lifted so as to permit thatch to be discharged through the opening formed by raising the flap, and thus allow the dethatching apparatus to be used as a mulching machine.

An important object of the present invention is to provide a dethatching apparatus which is ruggedly constructed, and which avoids mounting of the vibrationally-stressed dethatching blades directly to the rotating shaft of the dethatching drum, thereby extending the service life of the dethatching drum and the blades.

A further object of the invention is to provide a dethatching apparatus which can also be used for mulching as an optional mode of use.

A further object of the invention is to provide a dethatching apparatus which can be quickly and easily structurally altered by manual means so as to set the rollers which support the dethatching drum housing and dethatching drum at a precise location in relation to the ground traversed by the apparatus, thereby setting the depth of cut as may be desired.

Additional objects and advantages of the invention will become apparent as the following detailed description of the invention is read in conjunction with the accompanying drawings which illustrate a preferred embodiment of the invention.

BRIEF DESCRIPTION OF THE DRAWINGS

FIG. 1 is a top plan view of the dethatching apparatus of the invention. Certain parts of a grass bagging subassembly utilized have been removed in order to permit other parts of the apparatus to be viewed.

FIG. 2 is a side elevation view of the dethatching machine of the invention.

FIG. 8 is an exploded perspective view of the rotational shaft of the drum, and some of the dethatching blades and spacer elements which are mounted thereon in the apparatus of the invention.

FIG. 9 is a side elevation view of one of the dethatching blades.

FIG. 10 is an end elevation view of one of the spacer elements used on the dethatching rotor or drum for separating and spacing the dethatching blades.

FIG. 11 is a side elevation view of the spacer shown in FIG. 10.

DETAILED DESCRIPTION OF A PREFERRED EMBODIMENT OF THE INVENTION

Figure 3:
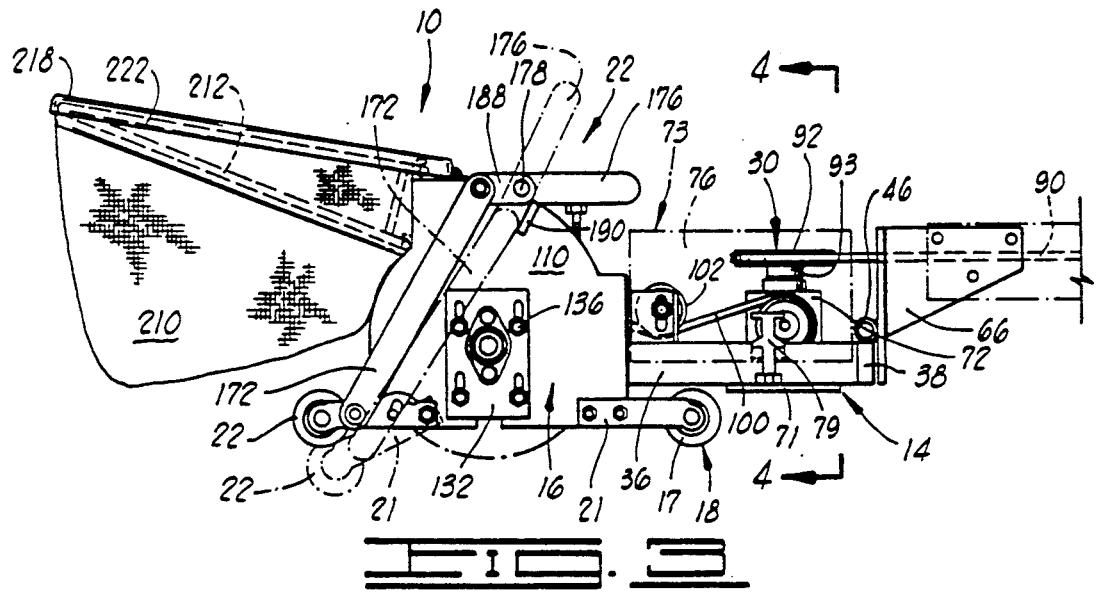
FIG. 3 is a side elevation view of the dethatching apparatus of the invention, showing in this instance, certain parts removed for clarity of illustration, and showing certain parts in dashed and broken lines to show, inter alia, different operative positions of a gauge roller element forming a part of the apparatus.

Referring initially to FIGS. 1 and 2 of the drawings, the dethatching apparatus of the invention is designated generally by reference numeral 10. It is shown mounted upon, or attached to, the front end of a self-propelled prime mover or driving apparatus, designated generally by reference numeral 12. The dethatching apparatus 10 is thus a front mounted system which is pushed ahead of a vehicle 12 upon which the operator is seated, and from which he controls the direction of travel of the dethatching apparatus, and its cutting actions.

The dethatching apparatus 10 is supported on a supporting framework or chassis, designated generally by reference numeral 14, and used to mount the dethatching apparatus on the supporting structural elements of the prime mover vehicle 12. At its forward end, the chassis or framework 14 is attached to a large, generally cylindrical rotor or drum housing designated generally by reference numeral 16.

The rotor housing 16 has secured to the rear side thereof, and projecting rearwardly therefrom, a stationary supporting roller subassembly, designated generally by reference numeral 18. The stationary supporting roller subassembly 18 includes an elongated, transversely extending roller 17, and a pair of transversely spaced, rearwardly extending mounting arms 19 between which the roller is rotatably journalled, and which are secured at their forward ends to the housing 16, as best shown in FIG. 2.

At the forward side of the rotor housing 16, a movable gauge roller subassembly 20 is pivotally mounted and cooperates with the stationary supporting roller subassembly 18. The roller subassemblies 18 and 20 support the drum housing 16, and the rotary dethatching drum which is mounted therein, in a selected position in relation to the ground upon which the dethatching apparatus is supported, and across which it moves.

There is further included, in addition to the housing 16 and roller subassemblies 18 and 20, a movable roller actuating subassembly, designated generally by reference numeral 22 which functions to raise and lower the movable gauge wheel roller subassembly 20 in a manner hereinafter described. Mounted at the upper forward side of the rotor housing 16 is a thatch-bagging subassembly designated generally by reference numeral 24. The thatch-bagging subassembly 24 functions to receive thatch which is removed from a lawn by the dethatching apparatus, and is discharged through an elongated, transversely extending opening 25 at the forward upper side of the drum housing 16.

Mounted within the drum housing 16 for rotation about a horizontal axis is a multi-bladed dethatching drum, designated generally by reference numeral 26, and best illustrated in FIGS. 6-11.

A final subassembly utilized in the dethatching apparatus of the invention is the drum driving, power input subassembly. This subassembly is best illustrated in FIGS. 1, 3, 4 and 7, and is denominated generally by reference numeral 30.

Figure 6:
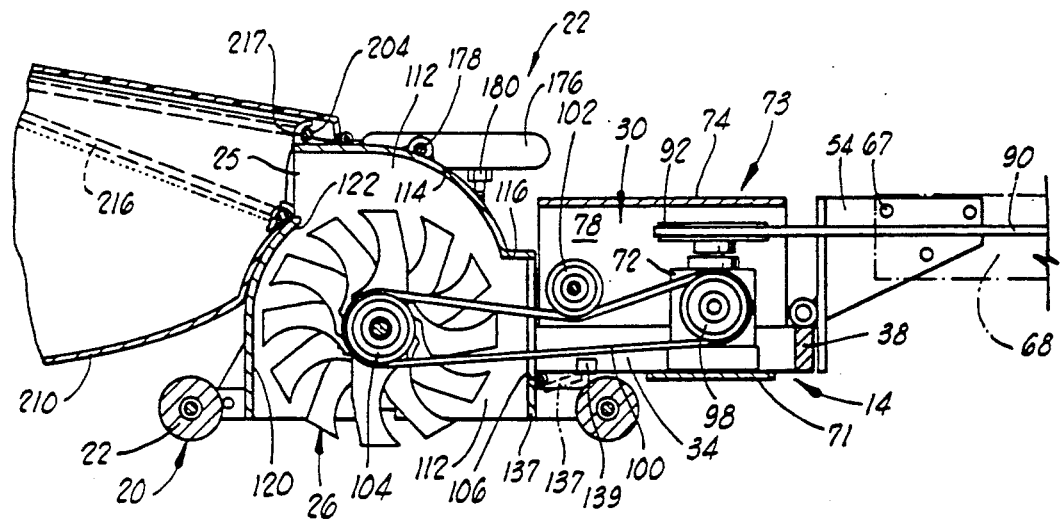
FIG. 6 is a longitudinal sectional view taken along a vertical plane which is taken along line 6—6 of FIG. 1.
Figure 7:
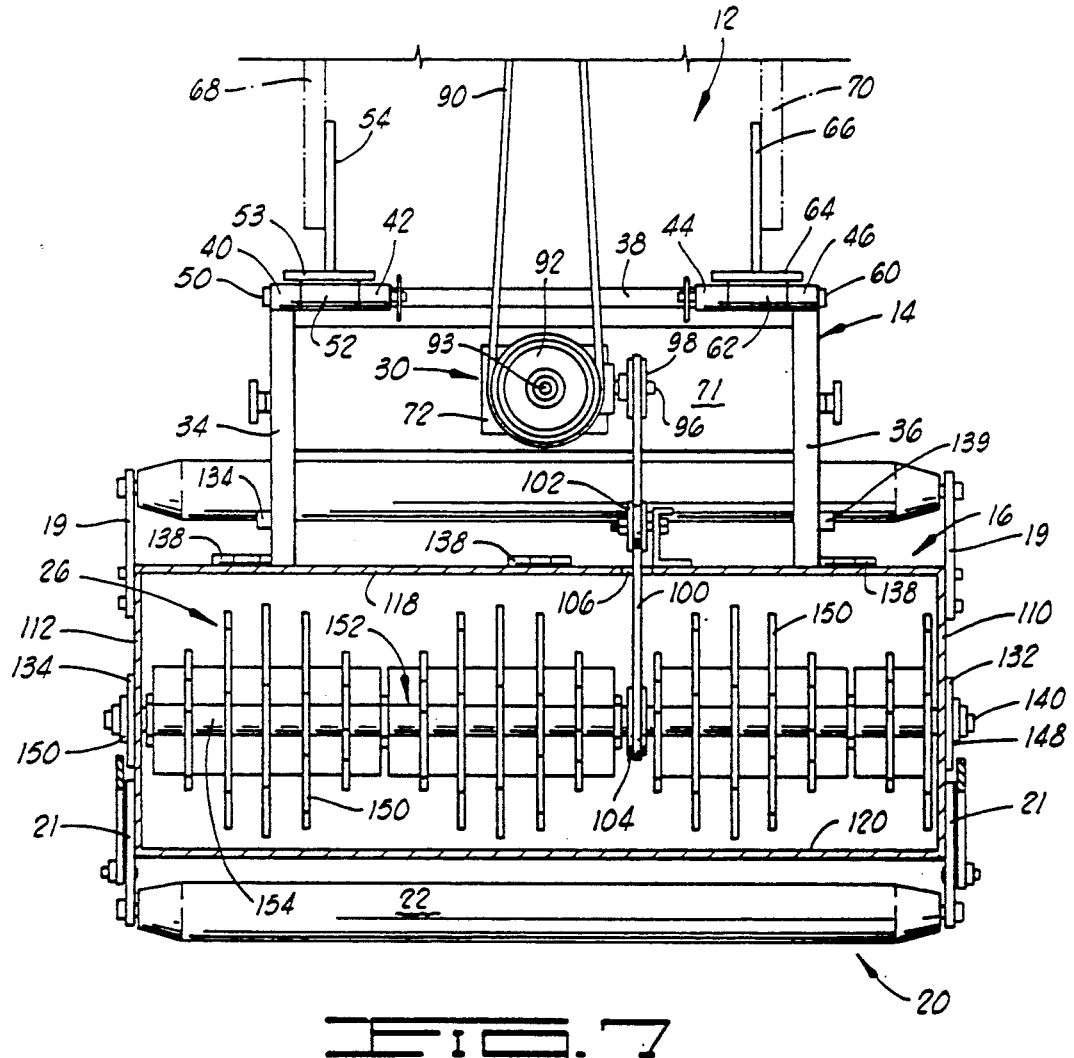
FIG. 7 is a sectional view taken along line 7—7 of FIG. 5.

Referring now to the details of construction of the chassis or framework 14, this subassembly includes a pair of laterally spaced, substantially parallel frame beams or struts 34 and 36 (see FIG. 7). These substantially horizontally extending structural elements are secured at their forward ends to the rear side of the drum housing 16, as best illustrated in FIGS. 1, 3, 6 and 7. The struts 34 and 36 are joined across the rear ends thereof by a transverse beam or frame member 38. The transverse frame member 38 carries two spaced pairs of spaced pin sleeves 40, 42 and 44, 46 located at opposite ends of the transverse frame member. The pin sleeves in each of the pairs 40, 42 and 44, 46 function to receive mounting plate securing pins which are used to detachably and pivotally secure trapezoidally-shaped mounting plates to the chassis 14 through the transverse frame member 38. Thus, as shown in FIGS. 1, 3, 6 and 7, the pin sleeves 40 and 42 in one pair receive an elongated pin 50 which has a head on one end limiting its movement through the sleeves and is held in position by a suitable cotter key at its other end. The pin 50 is used to pivotally engage a cylindrical knuckle 52 welded to the forward side of a face plate 53, which in turn is extended transversely across, and secured to, the trapezoidally-shaped mounting plate 54.

In similar fashion, the pin sleeves 44 and 46 receive an elongated pin 60 which is held in position by a suitable cotter key and which is passed through a knuckle 62 secured to the forward side of a face plate 64 which extends transversely across, and is secured to, a trapezoidally-shaped mounting plate 66. The mounting plates 54 and 66 extend substantially parallel to each other, and are suitably apertured, as shown at 67, to permit bolts or other fastening elements to be used to secure these mounting plates to a pair of spaced forwardly projecting arms 68 and 70 carried on the driving vehicle 12.

The chassis or framework 14 further includes a transversely extending gear box support plate 72. The gear box support plate 72 is a flat, horizontally extending plate which is welded at its opposite ends to the under side of the frame beams or struts 34 and 36.

A power transmission housing 73 which encloses a gear box 72 forming a part of the power input subassembly 30, hereinafter described, is illustrated in full lines in FIGS. 2 and 4, and in dashed lines in FIGS. 1 and 3. The power transmission housing 73 includes a horizontally extending top panel 74 which has its opposite end edges joined to a pair of vertically extending side panels 76 and 78 as perhaps best shown in FIGS. 2, 4 and 6. The parallel, vertically extending side panels 76 and 78 include offset steps at the lower edges (see FIG. 4) which permit pivoting latching handles 79 and 81 carried on the frame beams or struts 34 and 36 to be used to secure the power transmission housing 73 in position on the frame beams or struts 34 as shown in FIGS. 2 and 4.

The frame or chassis subassembly 14 functions to permit the dethatching apparatus to be mounted on the forward end of a power developing self-propelled vehicle 12 upon which the operator of the apparatus may be seated during its use. Moreover, by reason of the manner in which the elongated pins 50 and 60 are used for pinning the trapezoidally-shaped mounting plates 54 and 66 to the transverse member 38 for pivotation about a horizontal axis, the entire dethatching apparatus, except for the trapezoidally-shaped mounting plates 54 and 66, can be pivoted upwardly by means of a suitable hydraulic lift, if such is desired for over-the-road transport or the like.

Referring next to the power input subassembly 30, this subassembly includes those structural elements by which power is delivered for driving the rotary multi-bladed dethatching drum in rotation. Power for this purpose originates at the prime mover vehicle 12 upon which the dethatching apparatus is detachably mounted. The power input subassembly 30 includes a primary drive belt 90 which functions to rotatably drive a pulley 92 mounted on a shaft 93 which projects upwardly out of the gear box 72 (see FIGS. 1 and 4). The gear box 72 contains gearing which functions to transmit the rotational motion of the belt driven pulley 92 through a suitable shaft and gearing system to an output shaft 96 which is drivingly keyed to a pulley 98.

The pulley 98 drives a secondary belt 100 which passes under an idler pulley 102 and drivingly engages a drive pulley 104 as best illustrated in FIGS. 6 and 7. The drive pulley 104 is keyed to an elongated shaft forming a part of the multi-bladed rotor or drum subassembly 26 to be hereinafter described. The belt 100, in extending from the pulley 98 under the idler pulley 102 to the drive pulley 104, passes through a suitable opening 106 formed in the rear side of the drum housing 16 as illustrated in FIGS. 4, 6 and 7. By the described power transmission subassembly 30, power developed at the dethatcher carrying prime mover vehicle 12 is transmitted through the system of belts, pulleys and gears to the elongated shaft forming a part of the multi-bladed rotor or drum subassembly.

Figure 4:
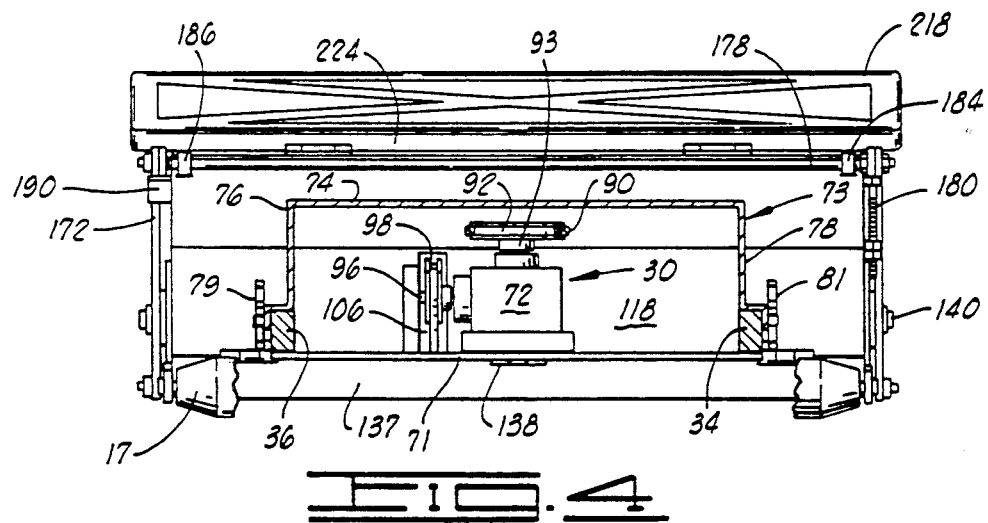
FIG. 4 is a sectional view taken along line 4—4 of FIG. 3. A part of a stationary roller which supports the drum and drum housing is broken away to enable the mulching flap plate to be viewed from the rear of the machine.

The drum housing 16 includes a pair of opposed end or side plates sides 110 and 112 (see FIGS. 2, 3 and 7). The drum housing 16 further includes an arcuate top wall 114 which is joined through an offset plate 116 to a rear wall 118 (see FIGS. 1, 6 and 7). A forward wall 120 is secured at its opposite ends to the end walls 110 and 112, and has an inwardly curved upper portion 122 which terminates at a location spaced downwardly from the arcuate top wall 114 so as to define the forwardly facing thatch discharge opening 25. The opening 25 functions to permit discharge of thatch from the interior of the drum housing 16 during operation of the dethatching apparatus. It will be noted in referring to FIGS. 2 and 3 that the two side plates 110 and 112 of the drum housing 116 are provided with vertically extending slots which project upwardly in these side plates from the lower edges thereof. These slots, denominated by reference numerals 128 and 130, function to receive the opposite ends of the multi-bladed drum subassembly 26 to be hereinafter described. The opposite ends of the multi-bladed drum subassembly 26 are secured in position within the drum housing 16 by the use of end mounting plates 132 and 134 which are attached by suitable bolts 136 extended through slots in the mounting plates 132 and 134 and through registering bolt holes in the side plates 110 and 112 of the drum housing 16 (see FIGS. 2 and 3). This mounting arrangement permits the multi-bladed drum subassembly 26 to be adjusted upwardly and downwardly within the drum housing 16 as may be desired to selectively locate the lowest point in the rotational arc of the blades carried on the drum shaft, as hereinafter described.

The multi-bladed dethatching drum subassembly 26 is best illustrated in FIGS. 6–11. The drum subassembly 26 includes an elongated shaft 140 which is hexagonally configured in cross-section over a major portion of its length, as shown in FIG. 8. At its opposite ends, the shaft 140 is turned down to a circular cross-sectional configuration, as shown at 142 and 144. At these locations, the ends of the shaft 140 project through the side plates 110 and 112 of the drum housing 16 and are secured within suitable journals 148 and 150 which are mounted upon the side plates 110 and 112, respectively, hereinbefore described. These plates are, as previously indicated, adjustably secured to the side walls 110 and 112 of the drum housing subassembly 16 by means of suitable bolts or fasteners 136.

A plurality of cutter blades 150 are mounted at axially spaced intervals along the length of the shaft 140. The cutter blades 150 are indirectly mounted on this shaft by the use of spacer elements 152. Each of the spacer elements 152 has a central hub 154 which has a bore 156 therethrough which is multi-sided as shown in FIG. 10. The bore 156 mates with, and is keyed to, the hexagonal shaft 140 so as to rotate with this shaft. The central hub 154 of each spacer element is further characterized as including a projecting hexagonal locking sleeve 158 which has an external configuration such that it fits snugly within a hexagonal aperture 159 formed in the center of each blade 150. Thus, each blade 150 is keyed to the hub 154 and locking sleeve 158 of one of the spacer elements 152 which in turn is keyed to the shaft 140 so that each hub and blade undergo rotation with the shaft 140. Each hub 154 further includes a pair of diametrically opposed, radially outwardly extending fan plates 162 and 164 as best illustrated in FIGS. 7, 10 and 11. When the blades 150, spacer elements 152 and elongated shaft 140 are assembled in operational status, the appearance of the drum subassembly is that which is illustrated in FIG. 7 of the drawings. It will be noted that the drive pulley 104, previously described, is keyed to a relatively centrally located portion of the shaft 140 and functions to drive the shaft in rotation. As previously explained, the opposite ends of the shaft 140 are mounted in suitable journals 148 and 150 to permit the shaft to undergo rotation about a horizontal axis which is colinear with the axis of the shaft.

In order to provide a capability for discharging thatch material from the rear lower side of the drum housing 16 so that the dethatching apparatus can perform a mulching function, a hinged flap is provided at that location and is there denominated generally by reference numeral 137 (see FIGS. 4 and 6). The flap 137 is an elongated rectangular metallic plate which is hinged by suitable hinges 138 spaced along its upper side and functioning to hinge this flap or plate to the rear side of the drum housing 16. At a time when it is desired to permit the thatch to discharge rearwardly through the opening provided by the raising of this flap 137, the flap is raised and is secured by suitable latch elements 139, one of which is provided on each of the parallel frame beams or struts 34 and 36. When the mulching flap 137 is not raised to permit mulching to occur, the flap is secured in line with the vertical back wall 118 of the drum housing 16 by any suitable latching means which prevents it from pivoting about the horizontal axis defined by the pivotal axes of the hinges 138.

The movable roller actuation subassembly 22 includes a pair of upwardly and rearwardly extending forelinks 170 and 17 disposed at opposite ends of the rotor housing 16. The lower ends of the forelinks 170 and 172 are pivotally connected to the movable roller support arms 21 as shown in FIGS. 2 and 3. The movable roller support arms 21 are, as previously explained, pivotally connected at one end to the rotor or drum housing 16 so that the arms can pivot about a horizontal axis to allow the elongated movable supporting roller 22 to be raised and lowered. This movement will, in turn, raise or lower the multi-bladed dethatching drum 26 relative to the ground so that the thatch is cut more or less deeply, and is removed to a greater depth, or a lesser depth, according to the position at which the movable supporting roller 22 is set.

Figure 5:
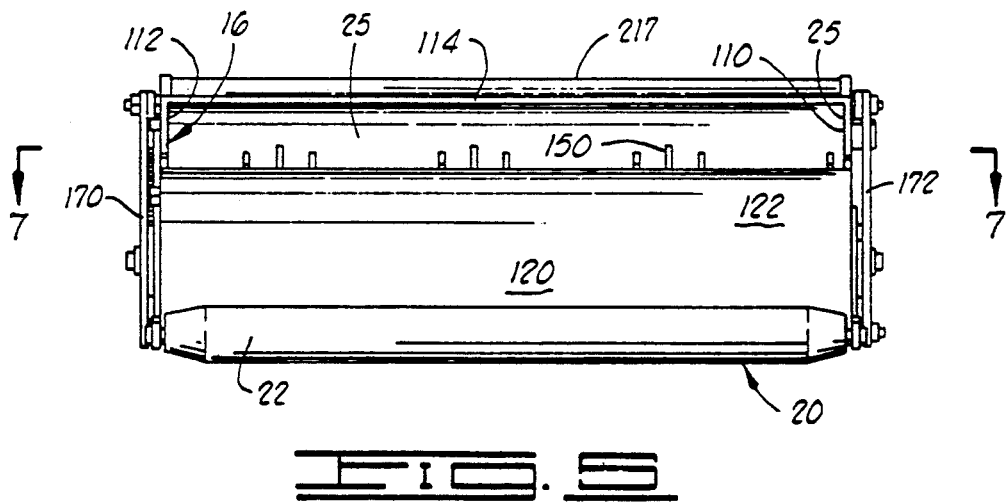
FIG. 5 is a front elevation view of the dethatching apparatus of the invention with the thatch-catching bag removed.

The forelink 170, as illustrated in FIG. 2, has its upper end connected to the forward end of an elongated handle link 176. The elongated handle link 176, in addition to having its forward end connected to the upper end of the forelink 170, has a pivot point slightly forward of the center of the handle link where the handle link is pivotally keyed to one end of an elongated pivot rod 178 which extends across the upper side of the rotor or drum housing 16, as best illustrated in FIGS. 1, 4 and 5 of the drawings. At a time when the handle link 176 is pivoted upwardly (clockwise as viewed in FIG. 2) about the pivotal axis of the pivot rod 178, the pivot rod also rotates about its axis by reason of being keyed to the link 176. The roller 22 is then caused to move downwardly relative to the drum or rotor housing 16, thus causing the dethatching drum 26 to be lifted upwardly relative to the ground and the thatch thereon.

It will be noted that the weight of the apparatus bearing on the movable roller 22 causes an upward force to be applied to the forelinks 170 and 172, thus tending to cause the handle link 176 to be pivoted in a counterclockwise direction about its pivotal axis at the pivot rod 178 as the handle link is viewed in FIG. 2. Counterclockwise movement of the handle link 176 at this time is prevented by suitable adjustment of a threaded stop bolt 180 which can be fixed in a selected adjusted position on the drum or rotor housing 16 by threaded adjustment in a pair of internally threaded receiving nuts 182 mounted on the end face 112 of the housing 16, as shown in FIG. 2.

When the forelink 170 is adjusted in its position by use of the handle link 176 so as to raise and lower the movable roller 22, the position of the roller which is selected is then fixed by adjusting the threaded stop bolt 180 so that its head moves vertically until the forward end of the handle link 176 has been pivoted downwardly to a selected extent. This causes the forelinks 170 and 172 to be driven downwardly, and the movable roller 22 to be moved down, to a position such that the rotor or drum housing 16 is actually raised further from the ground, and the extent to which the thatch is removed becomes relatively shallow.

It should be pointed out that the pivot rod 178 is pivotally mounted on the rotor housing 16 by means of a pair of journals axially spaced therealong, and secured to the upper side of the housing for pivotally receiving the pivot rod. These are denominated by reference numerals 184 and 186 and are best illustrated in FIG. 1 of the drawings.

On the opposite side of the dethatching apparatus from the side at which the forelink 170 is located, the forelink 172 has an upper end which is pivotally connected to a short connector link 188. The connector link 188, which has its forward end connected to the forelink 172, has its rear end keyed to the pivot rod 178 as best illustrated in FIGS. 1 and 3 of the drawings. Immediately adjacent the connector link 188, a stop plate 190 is secured to the end face of the rotor housing 16. The stop plate 190 projects outwardly so that it lies in the path of the connector link 188 and an end portion of the forelink 172, as such path is described by the movement of the connector link and the forelink when they are caused to undergo pivotation from the full line position shown in FIG. 3. This occurs at a time when the handle link 176 is pivoted upwardly from the position depicted in FIG. 2.

From the description thus far, it will be perceived that the orientation of the dethatcher cutter blades 150 relative to the thatch to be removed can be selectively adjusted both by movement upwardly and downwardly of the mounting plates 132 and 134 to thereby move the entire multi-bladed dethatching drum upwardly and downwardly within its drum housing 16, and also by pivoting the handle link 176 upwardly and downwardly about the transverse, horizontally extending pivotal axis coincident with the elongated axis of the pivot rod 178 mounted atop the rotor housing 16. These movements, in combination, can place the high speed rotating tips of the dethatching blades 150 at precisely any desired location in relation to the thatch and the roots of the grass.

The thatch-bagging subassembly 24 is mounted at the forward side of the dethatching apparatus, and is supported upon the drum or rotor housing 16. The thatch-bagging subassembly 24 includes a relatively large, preferably tubular or bar stock framework 200 (see FIG. 1). The framework 200 is preferably rectangular in configuration and includes a forward frame element 202 and a rear frame element 204 which extends substantially parallel to the frame element 202. The large flexible bag 210 is then hung from the frame 200 of the thatch-bagging subassembly 24. The suspended bag 210 is illustrated in FIGS. 1, 2, 3 and 6 of the drawings.

The framework 200 further includes a rigid internal, brace element 211 which projects forwardly and upwardly within the bag and includes a pair of opposed, substantially parallel tubular side members 212 and 214. These are connected to a transverse rod 216 located at the rear side of the bag and defining the lower side of a rearwardly facing opening through which thatch is discharged from a opening 25 in the housing 16 into the flexible bag as it hangs from the framework 200.

The thatch-bagging subassembly 24 is mounted in its operative position by the engagement of the frame rod or element 204 with a turned over, rearwardly opening semicylindrical sleeve 217, as shown in FIGS. 5 and 6. The turned over, semicylindrical sleeve 217 extends completely across the transverse width of the housing 16, and thus provides a firm and stable support for the thatch-bagging subassembly 24 by reason of its extensive or lengthy engagement with the frame element 204. A removable, relatively rigid cover plate 218 extends across the open, upper side of the bag 210, and covers the bag by means of peripheral flanges 220, 222, 224 and 226 which pass over and around the rectangular framework formed by the elements 202, 203, 204 and the like at the upper side of the suspended bag 210.

It will be perceived from the description of the thatchbagging subassembly 24 that the entire bagging subassembly 24 can be quickly removed from the forward side of the dethatching apparatus when the bag 210 becomes full of thatch simply by pivoting the forward end of the framework 200 upwardly enough to cause the rod 216 to move out of contact with the forward side of the housing 16 and thus allow the frame rod 204 to be extricated from the semicylindrical retaining sleeve 216.

USE AND OPERATION OF THE DETHATCHING APPARATUS

In the use of the dethatching apparatus, the apparatus is initially mounted on the forward side of a suitable prime mover vehicle 12 by the use of the projecting, trapezoidally-shaped mounting plates 54 and 66. This can be achieved by bolting, or any other suitable fashion. The trapezoidally-shaped mounting plates 54 and 66 are pivotally mounted to the chassis 14, and afford a means by which the dethatching apparatus can be hydraulically elevated and lowered. In some embodiments, the mounting plates 54 and 56 can also be pivotally connected to the mounting arms 68 and 70.

The dethatching apparatus is mounted ahead of the prime mover apparatus 12 in the manner, and in the position depicted in FIGS. 1, 3, 6 and 7. The operator of the entire apparatus rides on the prime mover vehicle 12 and has an unobstructed view ahead of him so that the position and functioning of the dethatching apparatus can be seen at all times.

At the time of commencing the dethatching operation, it will, in most instances, be desirable to locate the thatch-bagging subassembly 24 in its cantilevered mounting at the forward side of the drum or rotor housing 16, as best shown in FIGS. 1, 2, 3 and 6. When the thatch-bagging subassembly 24 is thus supported, it is positioned to receive thatch which has been removed from a thatch locked lawn by the rotating, multi-bladed thatching drum 26, in a manner hereinafter described. The loosened thatch is then propelled forward through the opening 25 at the upper forward side of the rotor or drum housing 16. This opening 25 and its relationship to the thatch-bagging subassembly 24 is best illustrated in FIG. 6.

At this time, the rigid cover plate or panel 218 forming a part of the thatch-bagging subassembly 24 is mounted in position so as to cover the upper side of the flexible bag 210. It will be noted that the thatch-bagging subassembly 24 can be very quickly and easily removed from the forward side of the dethatching apparatus by simply pivoting the forward side of the thatch-bagging subassembly supporting frame 200 upwardly, and then sliding the transverse frame element 204 rearwardly to decouple it from the semicylindrical reverse turned sleeve 217, which affords a point of anchorage for the mounted thatch-bagging subassembly. The entire thatch-bagging subassembly 24 can then be manually moved to a position of discharge of the thatch therefrom so as to empty it and allow it to be re-mounted for further dethatching operations.

Prior to commencing the dethatching operation, it will normally be desirable to adjust the depth to which the blades 15 of the multi-bladed dethatching drum 26 will cut into the matted grass and thatch, and therefore the depth to which thatch will be cut and removed from the lawn. Adjustment of this orientation is achieved by the use of the movable roller actuation subassembly 22. By rotating the handle link 176 clockwise, so as to cause it to pivot about the pivotal axis of the pivot rod 178, the forward end of the handle link will be pivoted downwardly, and this causes the upper end of the forelink 170 to be moved both downwardly and slightly rearwardly. The predominant motion of this forelink is, however, downwardly, and the effect of this is to cause the pivotal support arms 21 for the movable supporting roller 22 to move downwardly. The drum housing 16 is thus caused to be elevated relative to the ground. The extent to which this elevation is caused to occur can be carefully and finely adjusted by the degree to which the handle link 176 is pivoted in a clockwise direction as it is shown in FIG. 2. Once the position of the movable roller 22 has been fixed as desired, the threaded bolt 180 is threaded to a position so that as to hold the handle link 176 in this position. The upward force exerted on the movable roller 22 will tend to pivot the handle link 176 in a counterclockwise direction, but this will be prevented by the adjustment which has been set on the threaded adjusting bolt 180 so as to place it precisely at the location desired beneath, and in opposition to movement of, the handle link.

As has previously been pointed out, it is also possible to adjust the height of the dethatching blades 150 in relation to the thatch impacted grass or surface of the ground by moving the end mounting plates 132 and 134 by which the multi-bladed dethatching drum 26 is mounted within the drum housing 16. This adjustment functions to set the axis of rotation of this drum, and, indeed, the entire drum, either higher or lower as may be desired. This thus constitutes a further adjustment of the position of the rapidly rotating tips of the dethatching blades 150 as the drum 26 undergoes rotation.

As has been previously pointed out, it may be desirable from time to time to utilize the dethatching apparatus of the invention for mulching. In such case, it is desirable to sever thatch from its impacted position in the roots of the grass from which it is to be removed, and then pass this removed thatch outwardly in a horizontal direction for re-deposit on the area across which the dethatching apparatus is passing. Where such mulching operation is desirable, the elongated plate or panel 137 located at the rear lower side of the cylindrical housing 16 is unlatched so that it can be pivoted upwardly about a horizontal axis to provide an opening of from about two to about four inches at the rear side of this housing, and extending completely transversely across the housing. When the plate or panel 137 has thus been pivoted rearwardly and upwardly, it can be latched in its open position by means of the latches 139 carried on the parallel struts 34 and 36, as previously described. Driving the dethatching apparatus in a forward direction will cause the loosened thatch to be propelled rearwardly through the opening at the lower side of the housing, and deposited on the ground as a mulch.

The multi-bladed dethatching drum assembly is an important structural aspect of the present invention. The blades which are utilized, and are specially curved to afford enhanced cutting action, do not actually contact, and are not mounted directly on, the shaft 140. Rather, as previously described, each blade mounts upon the sleeve 158 extending from one side of each one of the spacer elements 154. This functions to protect the shaft 140 from damage when the blades strike an obstruction in the ground, and the vibration is transmitted through the blade plate to the central rotational axis to which the blade is mounted. Also, the relatively large diameter hex surface on the sleeve 158 projecting from the spacer 154, provides a greater surface area to hold the blade 150 in a selected position without the blade wearing out or becoming loosened so soon during the operating life of the structure.

In sum, the construction of the multi-bladed dethatching drum, including the type of shaft employed, the spacer elements used and the blade mounted thereon constitute a very sturdy and trouble free structure. The fan plates or vanes 162 and 164 on each of the spacers also help to impart mechanical strength to the drum subassembly, but also prevent thatch build-up between the blades and aid in propelling the severed thatch out through the opening at the forward upper side of the drum housing.

Although a preferred embodiment of the invention has been herein described in order to illustrate the principles of the invention and to enable those skilled in the art to understand the invention and be able to reproduce it from the description here appearing, it will be understood that this preferred embodiment which has been referred to here, and described in detail, is but one of many embodiments which can be constructed all in reliance upon the same basic and underlying principles. Changes and modifications of structure, therefore, which continue to rely on such basic underlying principles are deemed to be circumscribed by the spirit and scope of the invention, except as the same may be limited by the appended claims or reasonable equivalents thereof.

What is claimed is:

1. A grass dethatching apparatus comprising:
   a frame adapted for mounting the dethatching apparatus on a supporting prime mover;
   drum housing mounted on the forward end of said frame and having a thatch discharge opening thereinto;
   a pivotally movable transverse forward roller means mounted on the forward side of said drum housing for adjusting the distance above the ground at which the drum housing is carried;
   supporting roller means mounted on the rear side of said drum housing and cooperating with said forward roller means to support said drum housing during the user of said apparatus for dethatching;
   a rotary multi-based dethatching drum subassembly rotatably mounted in said drum housing for rotation about a substantially horizontal axis, said rotary drum subassembly including:
      an elongated shaft;
      a plurality of blades mounted therealong at axially spaced intervals, said blades being circumferentially offset from each other around said shaft; and
      spacer elements mounted on said shaft and located between adjacent blades;
   a thatch catcher mounted on said drum housing at a location for catching thatch discharged therefrom through said thatch discharge opening; and
   means for driving said elongated shaft in rotation.

2. A grass dethatching apparatus as defined in claim 1 and further characterized as including means for adjustably raising and lowering said shaft within said drum housing to thereby concurrently raise and lower the entire rotary drum subassembly.

3. A grass dethatching apparatus as defined in claim 1 wherein each of said blades is mounted on, and keyed to, one of said spacer elements and is out of contact with said shaft.

4. A grass dethatching apparatus comprising:
   a frame adapted for pivotally mounting the dethatching apparatus on a supporting prime mover;
   a drum housing mounted on the forward end of said frame and having a thatch discharge opening in one side thereof;
   forward roller means mounted on the forward side of said drum housing for adjusting the distance above the ground at which the drum housing is carried;
   an adjusting linkage mounted on said drum housing and accessible at the upper side of said drum housing and connected to said forward roller means for facilitating manual adjustment of said forward roller means from a location above said drum housing to set the distance above the ground at which the drum housing is carried;
   a rotary multi-bladed dethatching drum subassembly rotatably mounted in said drum housing for rotation about a substantially horizontal axis, said rotary drum subassembly including:
      an elongated shaft;
      a plurality of spacer elements mounted along the length of said shaft and contiguous to each other; and
      a plurality of blades mounted axially along said shaft at axially spaced intervals, said blades being circumferentially offset from each other around said shaft, and each of said blades being mounted on, and keyed to, one of said spacer elements so that each of said blades is out of contact with said shaft;
   a thatch-catching container mounted on said drum housing at a location for catching thatch discharged therefrom through said thatch-discharge opening;
   means for driving said rotary dethatching drum subassembly in rotation about said substantially horizontal axis; and
   means for adjustably raising and lowering said shaft within said drum housing to thereby concurrently raise and lower the entire rotary drum subassembly relative to said drum housing without disconnection of said driving means.

* * * * *

UNITED STATES PATENT AND TRADEMARK OFFICE
CERTIFICATE OF CORRECTION

PATENT NO. : 5,142,852
DATED : September 1, 1992
INVENTOR(S) : Danny L. Nelson

It is certified that error appears in the above-identified patent and that said Letters Patent is hereby corrected as shown below:

Column 7, line 3, delete "17" and insert -172-.
Column 9, line 61, delete "15" and insert -150-.

Column 11, line 35, before "drum" insert -a-.
Column 11, line 45, delete "user" and insert -use-.
Column 11, line 46, delete "multi-based" and insert -multi-bladed-.

Signed and Sealed this

Thirty-first Day of August, 1993

Attest:

BRUCE LEHMAN

Attesting Officer

Commissioner of Patents and Trademarks